(12) United States Patent
Balder

(10) Patent No.: US 9,834,976 B2
(45) Date of Patent: Dec. 5, 2017

(54) DEVICE FOR DETECTING THE POSITION OF AN AUTOMATED DOOR AND METHOD

(71) Applicant: Assa Abloy Entrance Systems AB, Landskrona (SE)

(72) Inventor: Jan Balder, AS Heerhugowaard (NL)

(73) Assignee: ASSA ABLOY ENTRANCE SYSTEMS AB, Landskrona (SE)

( * ) Notice: Subject to any disclaimer, the term of this patent is extended or adjusted under 35 U.S.C. 154(b) by 247 days.

(21) Appl. No.: 14/649,756

(22) PCT Filed: Dec. 5, 2013

(86) PCT No.: PCT/EP2013/075603
§ 371 (c)(1),
(2) Date: Jun. 4, 2015

(87) PCT Pub. No.: WO2014/086899
PCT Pub. Date: Jun. 12, 2014

(65) Prior Publication Data
US 2015/0316915 A1    Nov. 5, 2015

(30) Foreign Application Priority Data
Dec. 7, 2012 (SE) ...................... 1251393

(51) Int. Cl.
*E05F 15/603* (2015.01)
*G05B 15/02* (2006.01)
(Continued)

(52) U.S. Cl.
CPC ......... *E05F 15/603* (2015.01); *E05F 15/668* (2015.01); *G05B 15/02* (2013.01);
(Continued)

(58) Field of Classification Search
CPC ..................................... Y10T 403/10
(Continued)

(56) References Cited

U.S. PATENT DOCUMENTS 2,025,067 A * 12/1935 Miller .................... F16L 35/00
138/109
2,914,332 A * 11/1959 Cervini .................. B23B 31/02
279/83
(Continued)

FOREIGN PATENT DOCUMENTS

DE    20 2004 009047 U    8/2004
JP    2006-307493 A    11/2006
(Continued)

OTHER PUBLICATIONS

International Type Search Report from Swedish Patent Office for priority application SE 1251393-3 dated May 31, 2013.
(Continued)

*Primary Examiner* — Katherine Mitchell
*Assistant Examiner* — Marcus Menezes
(74) *Attorney, Agent, or Firm* — Wissing Miller LLP

(57) ABSTRACT

The invention relates to a device (1) for detecting the position of an automated door, and a method of installation thereof, wherein the device comprises a connector (4, 20) adapted to couple the device to a door drive shaft (28, 32) moving an automated door such as a sectional overhead door, an encoder means (5) coupled to the connector (4, 20) and generating a position signal based on the movement of the door drive shaft (28, 32), which position signal is indicative of the door position, communication means connected to the encoder means (5) for transferring the position signal to a controlling device (34), and mounting means (2, 3) for mounting the device.

21 Claims, 4 Drawing Sheets

(51) Int. Cl.
*E05F 15/668* (2015.01)
*E05F 15/77* (2015.01)
*E05F 15/665* (2015.01)

(52) U.S. Cl.
CPC ............ *E05F 15/665* (2015.01); *E05F 15/77* (2015.01); *E05Y 2201/706* (2013.01); *E05Y 2400/32* (2013.01); *E05Y 2400/44* (2013.01); *E05Y 2600/60* (2013.01); *E05Y 2800/17* (2013.01); *Y10T 403/10* (2015.01)

(58) Field of Classification Search
USPC .................................. 285/12; 403/222, 344
See application file for complete search history.

(56) References Cited

U.S. PATENT DOCUMENTS

| | | | | |
|---|---|---|---|---|
| 3,545,777 | A | * | 12/1970 | Friedheim ............ B23B 31/1107 279/7 |
| 4,266,813 | A | * | 5/1981 | Oliver ..................... F16L 25/14 285/12 |
| 4,712,812 | A | * | 12/1987 | Weir, III ................. F16L 25/14 138/96 T |
| 5,462,317 | A | * | 10/1995 | Keller ............... B05C 17/00506 222/566 |
| 5,711,112 | A | | 1/1998 | Barten et al. |
| 5,841,253 | A | | 11/1998 | Fitzgibbon et al. |
| 6,118,243 | A | * | 9/2000 | Reed ........................ E05F 15/41 318/282 |
| 6,164,015 | A | | 12/2000 | Kawanobe et al. |
| 6,612,618 | B2 | * | 9/2003 | Giordano ................ F17D 5/02 285/12 |
| 6,785,934 | B2 | * | 9/2004 | Bruno ..................... A47L 9/248 15/323 |
| 7,390,024 | B2 | * | 6/2008 | Giordano ................ G01M 3/02 285/12 |
| 7,985,041 | B2 | * | 7/2011 | Lin ........................ F16B 37/00 411/388 |
| 8,026,809 | B2 | | 9/2011 | Schafer et al. |
| 8,348,577 | B2 | * | 1/2013 | Ferslew .................. F16B 33/02 411/427 |
| 2007/0039243 | A1 | | 2/2007 | Theile et al. |
| 2008/0047784 | A1 | | 2/2008 | Krause et al. |

FOREIGN PATENT DOCUMENTS

| | | |
|---|---|---|
| JP | 2012-001969 A | 1/2012 |
| KR | 10-0846747 B | 7/2008 |
| KR | 10-1194628 B | 10/2012 |

OTHER PUBLICATIONS

First Office Action issued in corresponding European application No. 13 802 028.4 dated Jul. 13, 2016.

\* cited by examiner

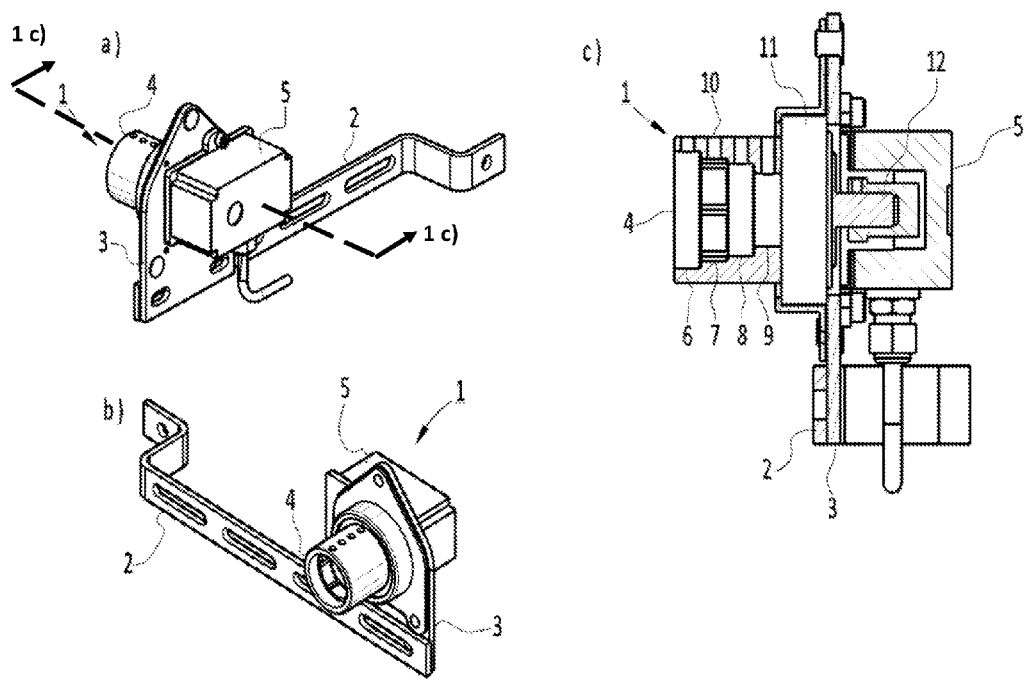

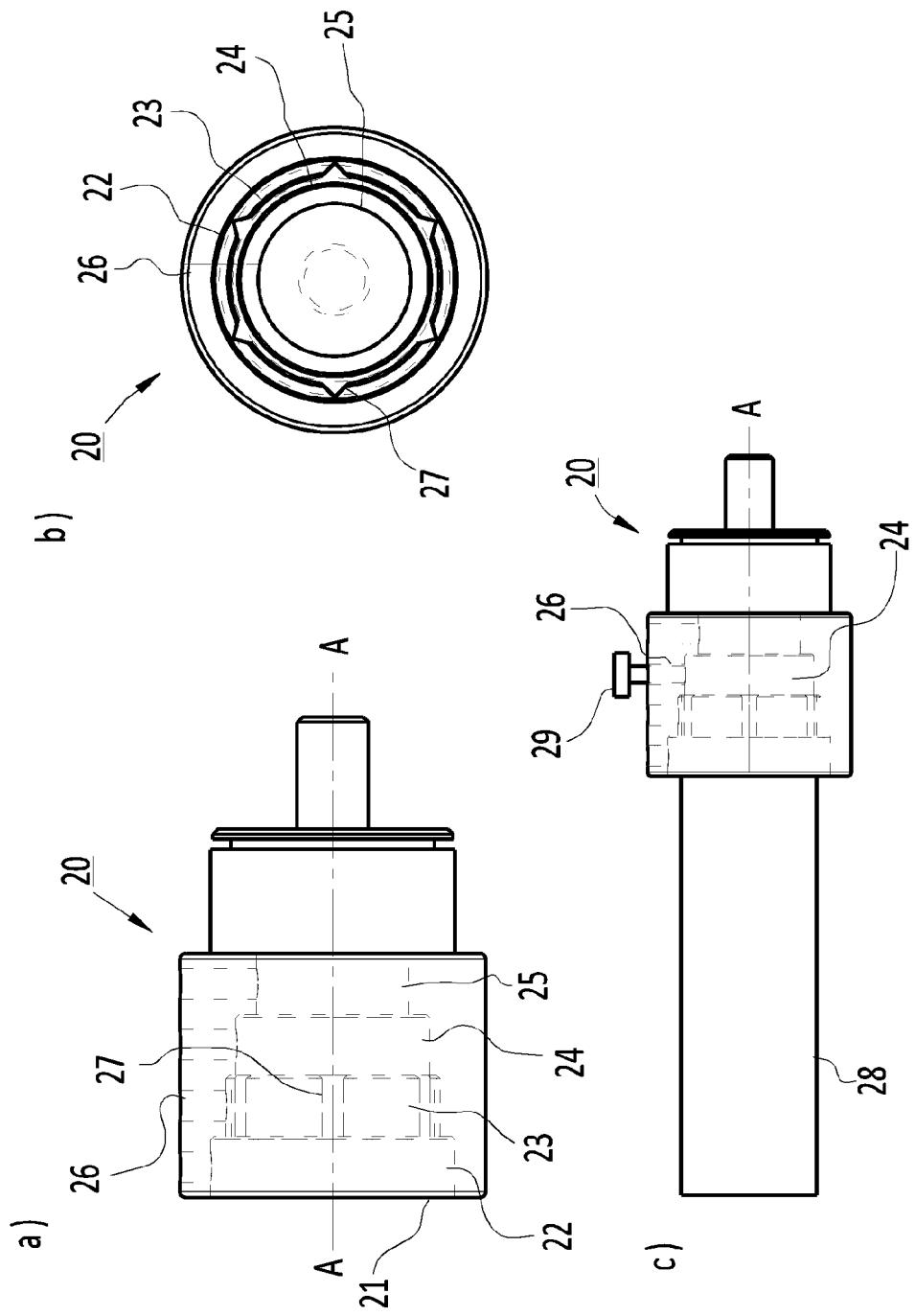

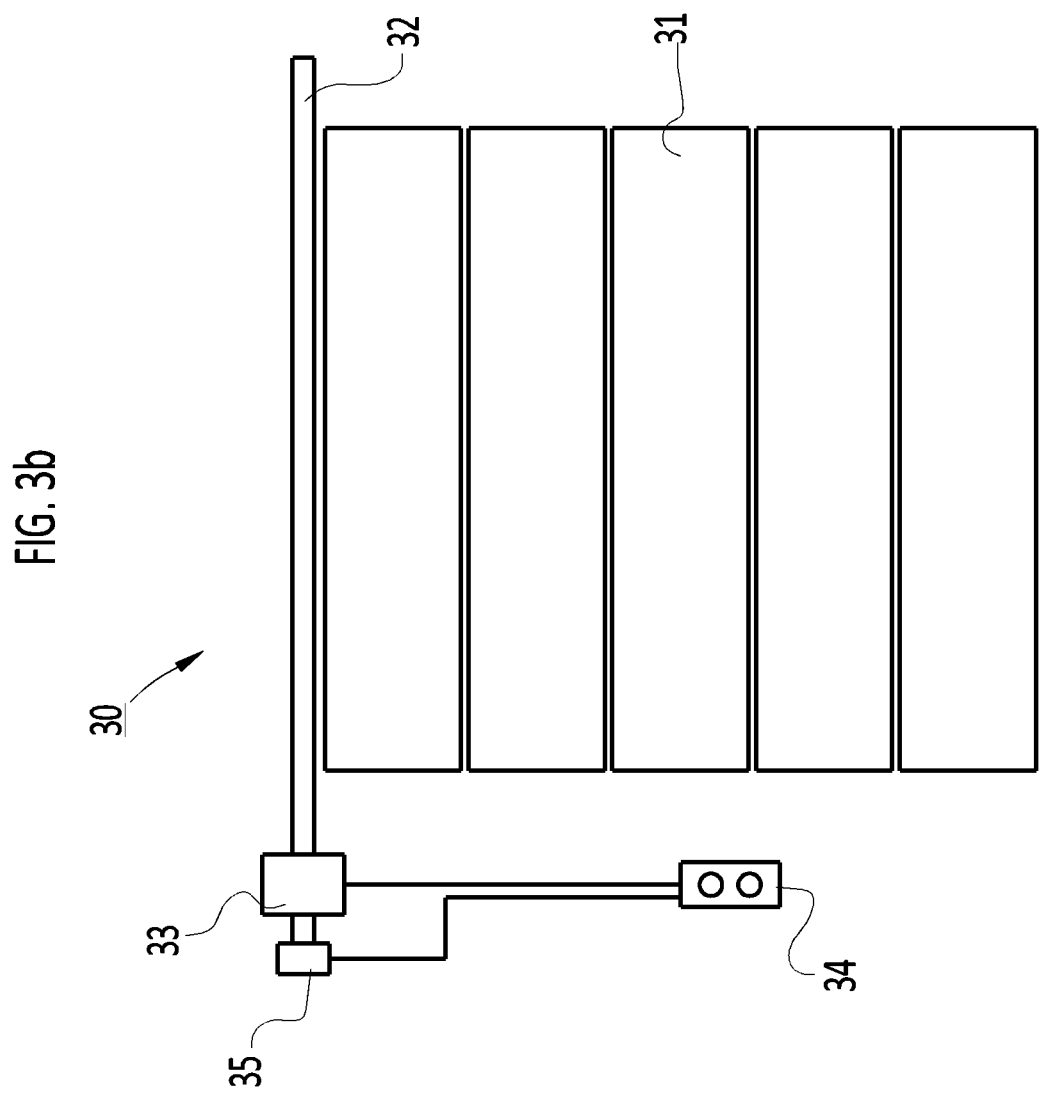

DEVICE FOR DETECTING THE POSITION OF AN AUTOMATED DOOR AND METHOD

This application is a 371 of PCT/EP2013/075603 filed on Dec. 5, 2013, published on Jun. 12, 2014 under publication number WO 2014/086899, which claims priority benefits from Swedish Patent Application No. 1251393-3 filed Dec. 7, 2012, the disclosure of which is incorporated herein by reference.

FIELD OF THE INVENTION

The invention relates to a device for detecting the position of an automated door, and a method of installation.

BACKGROUND OF THE INVENTION

Automated doors, for instance sectional overhead doors, sliding doors or roll doors, typically comprise a motor connected to a door drive shaft for moving the door between an open and a closed position, and vice versa. For a sliding door, the door drive shaft may for instance be the shaft provided with a reel or sprocket for moving a belt that displaces the door. For roll doors, the door drive shaft may be the shaft the roll door is wrapped around in the opened position.

The motor typically is provided with an integrated encoder device that determines the rotational position of the motor shaft. The rotational position of the motor shaft can be related to the position of the door. Calibration is usually required to determine which rotational position corresponds to a fully opened position and the closed position, intermediate positions may be interpolated. The information from the encoder can be used by a controlling unit connected to the encoder to operate the driving motor. For instance, the motor would be stopped when the fully closed or opened position is reached.

OBJECT AND SUMMARY OF THE INVENTION

Encoder devices in known motors used for automated doors may malfunction and need replacement. As the encoder device is integrated in the motor this requires replacement of the complete motor, even if the motor part is functioning correctly. It is an object of the invention to provide an easier way to install and/or replace devices for detecting the position of an automated door.

The invention provides a device for detecting the position of an automated door, in particular a sectional overhead door, a sliding door or a roll door, comprising a connector adapted to couple the device to a door drive shaft moving an automated door, encoder means coupled to the connector generating a position signal based on the movement of the door drive shaft, which position signal is indicative of the door position, communication means connected to the encoder means for transferring the position signal to a controlling device and mounting means for mounting the device.

Such a device can be installed independently of the motor. As an additional advantage, if an encoder in an existing motor would malfunction, the device as described herein can be installed to replace the integrated encoder without need for replacement of the motor. This saves both time and money, as the device as described herein is relatively cheap to manufacture, and easier and faster to install than a motor with an integrated encoder.

The position of a door is directly associated with the rotational position of the door drive shaft moving the door between a closed and open position. The rotational movement of a door drive shaft, i.e. the number of revolutions and fractions of a revolution, in relation to a closed and/or open position indicates the present state of a door, such as open, closed or a specific position therebetween. In case of a rollup door, the door drive shaft may be the shaft on which the roll door is wrapped around in the opened position. In case of a sliding door, the door drive shaft may be the shaft provided with a reel or sprocket moving a belt that displaces the door. In case of a revolving door, the door drive shaft may be the center shaft on which the door blades are mounted. The door drive shaft may be coupled to a motor, in particular to a motor shaft of a motor.

The connector may be adapted for coupling to a specific type of door drive shafts, but may also be a multiconnector suitable for various types of door drive shafts. The connection with the door drive shaft may be directly onto the door drive shaft, or indirectly for instance through sprockets, counting wheels, chains, belts and the like, wherein the connector may comprise a sprocket, a counting wheel, a chain, a belt or a combination thereof. The encoder unit may for instance be an optical, magnetical or mechanical encoder. The coupling could be non-physical if the device uses optical or electromagnetical means for determining the rotation position of the door drive shaft.

The communication means may for instance include an electrical signal output adapted for electrical wiring to a control unit. The mounting means comprise for instance a mounting plate for mounting on a solid object such as a wall, rails or other solid constructions, ensuring that the connector is allowed to rotate while keeping non-moving parts, such as an encoder, in position.

It is preferred if the connector is adapted for releasable coupling to a door drive shaft. This enables easy and fast positioning and replacement of the device. The releasable coupling can for instance be arranged with snap lock coupling, bolt connections or click connections. In contrast, encoders integrated in motors as known in the prior art are impossible to replace without completely disassembling the drive motor.

It is preferred if the connector is adapted for coupling to door drive shafts having various diameters and/or shapes. Preferably, the device is suitable for the most commonly used door drive shaft types. Most preferably, the connector is adapted for coupling to door drive shafts having diameter shapes selected from circular, triangular, square, pentagonal, hexagonal, heptagonal, and octagonal. Hexagonal diameter shapes are particularly popular in automated door systems. The connector itself may have a receptacle shape corresponding to the door drive shaft shape, or a shape derived thereof. Having a connector suitable for different door drive shaft types allows for easy replacement and installation without the need to bring a wide selection of different devices with different connectors. Particularly popular diameter sizes for door drive shafts in Europe are circular diameters 25 mm, 25.4 mm, 31.75 mm, 35 mm and 40 mm.

It is advantageous if the connector comprises multiple shaft slots for coupling to door drive shafts having various diameters and/or shapes. It is preferred if the multiple shaft slots are coaxially arranged along a shaft axis direction, in a decreasing shaft diameter order. This allows for a relatively simple construction wherein a door drive shaft may be inserted into the connector into the corresponding fitting slot. The connector having multiple shaft slots or receptacles could be defined as a multiconnector, and could for instance be suitable for two, three, four or more different door drive shaft types.

Preferably, the multiple shaft slots of the connector are shaped into a single piece of material. This allows for relatively simple construction, and retains optimal mechanical strength. The connector may for instance be gouged on a lathe from metals such as steel or alumina. Alternatively, the connector may be cast from metal or resin.

It is preferred if the connector is provided with securing means. This allows for optimal safe securing of the device connected to a door drive shaft. The securing means may for instance comprise adhesives, or rubber or plastic sealing. In a preferred embodiment, the securing means comprise a screw lock for locking the door drive shaft into a shaft slot. This may involve a screw or nut engaged into a securing lock opening.

Preferably, the encoder means are selected from the group consisting of mechanical rotary encoders, optical encoders, magnetic encoders, and conductive track encoders.

The communication means may be a simple electrical wire connection, but it is advantageous if the communication means comprise wireless communication means, preferably selected from the group consisting of RF, optical and infrared. This allows for a greater freedom and added time saving for installing the device.

In a preferred embodiment, the device is incorporated in a kit of parts further comprising a controlling device adapted for cooperation with the communication means of the device, and for controlling a drive motor connected to the door drive shaft. Such a kit allows for easy installation of the device on a door drive shaft and installing the controlling unit for controlling the door.

The present invention also provides an automated door system comprising a door, a door drive shaft moving the door, a drive motor driving the door drive shaft and a device according to above, wherein the connector of the device is coupled to the door drive shaft which in its turn is connected to the drive motor. The door drive shaft may be coupled to a motor shaft of the drive motor.

The invention further provides a method for installation of a device as described herein in an automated door system, comprising the steps of providing an automated door system comprising a drive motor connected to a door drive shaft driving the door, and coupling a connector of the device to the door drive shaft. Further, the method may involve the step of providing a controlling device for controlling the drive motor and for communication with the device.

Preferably, the drive motor is connected to a first distal end of the door drive shaft, and wherein the device is coupled to a second distal end of the door drive shaft opposite to the first distal end. This allows for easy installation and/or replacement of the device independently of the motor. This implies the motor will not need to be removed or replaced.

The invention is further elucidated by the following non-limiting embodiments.

BRIEF DESCRIPTION OF THE DRAWINGS

FIGS. 1a-1c show a device for detecting the position of an automated door.

FIGS. 2a-2c show a connector for the device in detail.

FIGS. 3a and 3b show the application of the device according to the invention in an automated door system.

DESCRIPTION OF PREFERRED EMBODIMENTS

Figure 3A:
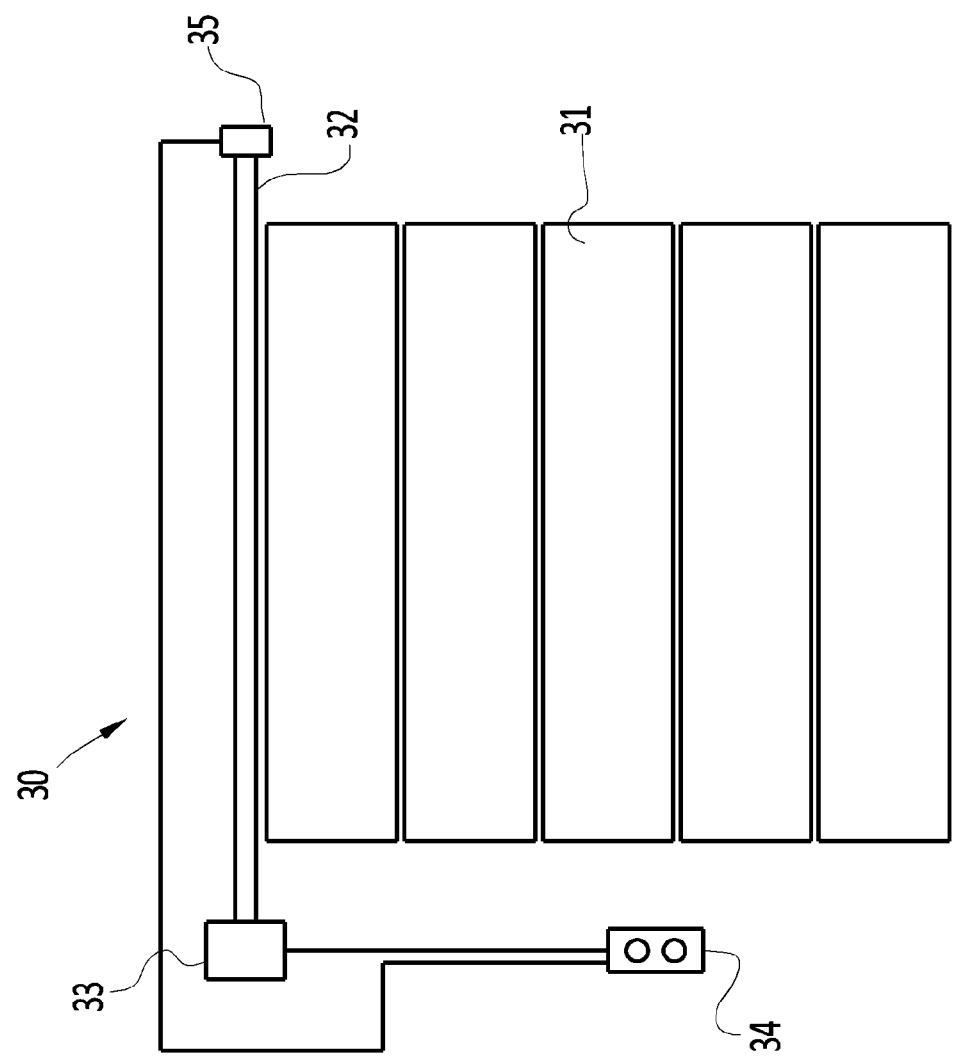

FIG. 1a-c show a device 1 for detecting the position of an automated door, mounted on a rails 2 through a mounting plate 3. The device 1 comprises a rotating connector 4 for releasably coupling the device to a door drive shaft for moving an automated door, capable of receiving various shaft diameter shapes and sizes. The rotating connector 4 is coupled with an encoder 5 that detects a rotation position of the door drive shaft. For a particular automated door, the open, closed and intermediate positions of the automated door in relation to the signal generated by the encoder 5 are calibrated. An external control unit (not shown) correlates the door drive shaft rotation position detected by the encoder to a predetermined position of the automated door. The encoder is coupled to a remote control unit through an optical or electrical wire. The connector 4 rotates together with the door drive shaft. The encoder detects the rotation of the connector and thus the rotation of the door drive shaft. The rotation of the door drive shaft, such as the number of revolutions and fractions of a revolution of the door drive shaft, corresponds to a movement of the door. The encoder generates a position signal based on the rotation of the door drive shaft. Thereby, the position of the door can be determined, since the open and closed positions of the door are known from a calibration. The position signal as well as the detected position of the door is thereby based on the rotational movement of the door drive shaft. Since the encoder detects the rotation of the door drive shaft and the position signal is based on the rotation of the door drive shaft, the position of the door is determined based on the rotation of the door drive shaft. Thereby, the position signal as well as the detected position of the door is independent of the rotation of a drive motor, the rotation of a motor shaft of a drive motor and the gear ratio between the door drive shaft and a drive motor.

FIG. 1c shows a cross section, showing the decreasing diameters sizes 6-9 arranged in the connector. The connector further comprises bolt holes 10 for securing a connected door drive shaft with a securing nut. The cross section also shows the connector fit into a rotating mount 11, and the distal end 12 of the connector inserted into the encoder 5.

FIG. 2a-c show a connector 20 for the device in FIG. 1 in detail, in a side view (2a) and top view (2b). Viewed from the entrance opening 21 of the connector, receptacles 22-25 for decreasing shaft diameters are incorporated, each provided with a bolt hole 26 for receiving a securing nut to secure a connected door drive shaft. Three of the receptacles are shaped to fit door drive shafts with circular diameters. The second receptacle 23 is provided with six additional recesses 27 for accommodating a hexagonal door drive shaft. Similarly, receptacles for differently shaped door drive shafts could be provided in the connector. Different connectors could be designed for different sets of door drive shafts, depending on the most common door drive shafts used in a particular geographical area. Alternatively, the connector could also be construed to be suitable for only one type of door drive shaft, by only forming one type of receptacle. Such a connector requires less material and construction effort, but lacks the functionality of a multiconnector such as connector 20.

FIG. 2c shows a connector 20 wherein a circular diameter door drive shaft 28 is inserted into the third circular receptacle, secured by a securing nut 29.

FIG. 3a schematically shows the application of the device according to the invention in an automated door system 30, in this case a sectional overhead door system. The system comprises a roll door 31 that is mounted on a door drive shaft 32. The door drive shaft 32 is driven by a drive motor 33, which is electrically connected to a control unit 34, for pulling the door 31 up to an open position, or lowering the door to a closed position. The control unit 34 is also connected to a device 35 for detecting the position of an automated door. In this example the connection is by wire, but the connection could also be wireless, for instance through infrared or RF signal. The door drive shaft 32 is connected to a drive motor, in particular to a motor shaft of a drive motor.

The device 35 comprising the encoder, such as the example shown in FIG. 1 or 2, is installed at a distal end of the door drive shaft 32 opposite to the motor 33. This is particularly advantageous if the device 35 was installed as a replacement for an encoder integrated in the motor 33. For such a replacement, for instance when the encoder integrated in the motor 33 is malfunctioning, allows to restore the encoder functionality without the need for replacing the full motor unit. Because the device 35 is placed at the opposite end, the original motor does not need to be removed.

FIG. 3*b* shows a system comparable to FIG. 3*a*. However in this case the door drive shaft 32 extends past the motor 33, and the device 35 as described herein is placed at the distal end on the same side as the motor. Such an arrangement allows for shorter wired connections with the control unit 34.

The invention claimed is:

1. A device for detecting a position of an automated door, the device comprising:
   a connector adapted to couple the device to a door drive shaft moving the automated door, wherein the connector comprises multiple shaft slots for receiving an end portion of one of door drive shafts having various diameters and having polygonal cross-sectional shapes,
   an encoder element coupled to the connector for generating a position signal based on a movement of the door drive shaft, the position signal indicating the door position,
   a communication element for transferring the position signal to a controlling device from the encoder element, and
   a mount for mounting the device, the mount being disposed between the encoder element and the connector.

2. The device according to claim 1, wherein the connector is adapted for releasable coupling to the door drive shafts.

3. The device according to claim 1, wherein the one of the door drive shafts is connected to a drive motor.

4. The device according to claim 2, wherein the polygonal cross-sectional shapes are selected from a group consisting of triangular, square, pentagonal, hexagonal, heptagonal, and octagonal.

5. The device according claim 2, wherein the connector is adapted for coupling to door drive shafts of diameters selected from a group consisting of 25 mm, 25.4 mm, 31.75 mm, 35 mm, and 40 mm.

6. The device according to claim 1, wherein the multiple shaft slots are coaxially arranged along a shaft axis direction, in a decreasing shaft diameter order.

7. The device according claim 1, wherein the multiple shaft slots are shaped into a single piece of material.

8. The device according to claim 1, wherein the connector is provided with a securing element.

9. The device according to claim 8, wherein the securing element comprises a screw lock for locking the one of the door drive shafts into a shaft slot.

10. The device according to claim 1, wherein the encoder elements is selected from a group consisting of mechanical rotary encoders, optical encoders, magnetic encoders, and conductive track encoders.

11. The device according to claim 1, wherein the communication element comprises a wire connection or wireless communication element, wherein the wireless communication element is selected from a group consisting of RF, optical and infrared.

12. The device according claim 1, wherein the device is incorporated in a kit of parts, wherein the controlling device is adapted for cooperation with the communication elements of the device, and adapted for controlling a drive motor connected to the door drive shaft.

13. An automated door system comprising the door, a drive motor driving the one of the door drive shafts and the device according to claim 1 wherein the connector of the device is coupled to the one of the door drive shafts which is connected to the drive motor.

14. A method for installation of the device according to claim 1 in an automated door system, comprising the steps of
   a) providing the automated door system comprising a drive motor connected to the door drive shaft driving the door, and
   b) coupling the connector of the device to the door drive shaft.

15. The method according to claim 14, wherein the drive motor is connected to an end of the door drive shaft and wherein the device is coupled to an end of the door drive shaft opposite to the end connected to the drive motor.

16. The method according to claim 14, wherein the method further comprises
   c) providing a controlling device for controlling the drive motor and for communication with the device.

17. A device for detecting a position of an automated door, the device comprising:
   a connector adapted to couple the device to a door drive shaft moving the automated door, wherein the connector comprises multiple shaft slots for receiving an end portion of one of door drive shafts having various diameters and having polygonal cross-sectional shapes;
   an encoder coupled to the connector and generating a position signal based on a movement of the door drive shaft, the position signal indicating the door position;
   a signal communicator connected to the encoder and to a controlling device, wherein the signal communicator transfers the position signal from the encoder to the controlling device; and
   a mount connected with the device, the mount being disposed between the encoder and the connector.

18. The device according to claim 17, wherein the connector is adapted for releasable coupling to the door drive shafts.

19. The device according to claim 17, wherein the multiple shaft slots are coaxially arranged along a shaft axis direction, in a decreasing shaft diameter order.

20. The device according to claim 17, wherein the one of the door drive shafts is connected to the device at one end of the door drive shaft and a motor at an opposite end of the one of the door drive shafts.

21. The device according to claim 17, wherein the multiple shaft slots comprise:
   a first shaft slot to accommodate a first door drive shaft having a first shape; and a second shaft slot having plural recesses to accommodate a second door drive shaft having a second shape that is different from the first shape.

* * * * *